United States Patent [19] [11] 4,308,117
Sweeney [45] Dec. 29, 1981

[54] GENERATION OF CHLORINE-CHLORINE DIOXIDE MIXTURES

[76] Inventor: Charles T. Sweeney, 448 Earle Rd., Hewitt, Tex. 76643

[21] Appl. No.: 181,125

[22] Filed: Aug. 25, 1980

Related U.S. Application Data

[63] Continuation-in-part of Ser. No. 121,115, Feb. 13, 1980, Pat. No. 4,248,681, and Ser. No. 121,114, Feb. 13, 1980, and a continuation-in-part of Ser. No. 92,645, Nov. 8, 1979, Pat. No. 4,256,552.

[51] Int. Cl.³ .......................... C25B 1/00; C25B 1/34; C25B 1/02; C25B 9/00
[52] U.S. Cl. ...................................... 204/101; 204/98; 204/128; 204/129; 204/255; 204/256; 422/37
[58] Field of Search .................. 422/37; 204/101, 128, 204/255, 256, 98, 129

[56] References Cited

U.S. PATENT DOCUMENTS 3,904,496 9/1975 Harke et al. ........................ 204/101

Primary Examiner—R. L. Andrews
Attorney, Agent, or Firm—Neal J. Mosely

[57] ABSTRACT

An electrolytic generator is disclosed having three sealed compartments, separated by two spaced ion-permeable membranes, one being a cation exchange membrane and the other being an anion exchange membrane, having a cathode in one end compartment, adjacent to the cation exchange membrane, and an anode in the other end compartment, adjacent to the anion exchange membrane. A bipolar electrode is positioned in the middle compartment between the anion and cation exchange membranes. When the cell is filled with brine and energized, hydrogen is evolved from the cathode-containing compartment and a chlorine/chlorine dioxide mixture from the anode-containing compartment for use in bleaching or in treating bodies of water, such as, swimming pools, baths, reservoirs, sewage, etc. The anode, cathode and bipolar electrode are preferably flat plate electrodes, although other configurations, such as, cylindrical electrodes may be used. The generator is characterized by a rapid start up when energized with electricity.

9 Claims, 3 Drawing Figures

GENERATION OF CHLORINE-CHLORINE DIOXIDE MIXTURES

CROSS-REFERENCE TO RELATED APPLICATIONS

This application is a continuation in part of Ser. No. 121,115, Feb. 13, 1980, now U.S. Pat. No. 4,248,681, and Ser. No. 121,114, Issue Fee paid Jan. 21, 1981 filed Feb. 13, 1980, and a continuation in part of Ser. No. 092,645, Nov. 8, 1979, now U.S. Pat. No. 4,256,552.

BACKGROUND OF THE INVENTION

1. Field of the Invention

This invention relates to new and useful improvements in electrolytic generators and to methods of generating mixtures of chlorine and chlorine dioxide and to systems of apparatus for generating mixtures of chlorine and chlorine dioxide for treating bodies of water, such as, swimming pools, baths, reservoirs, sewage, etc., and for bleaching chemical pulp, etc.

2. Brief Description of the Prior Art

The use of chlorine for disinfecting bodies of water, such as, swimming pools, baths, reservoirs, sewage, etc. is well known. In the past, chlorine has usually been supplied by direct application of chlorine gas from tanks containing the gas under pressure. There have also been a number of attempts to provide chlorine gas on a more limited scale by continuous electrolytic generating equipment.

The use of chlorine dioxide in disinfecting bodies of water and in bleaching chemical pulp is well known. Chlorine dioxide is a dangerous and explosive gas and is usually produced as an aqueous solution at the point of usage by chemical decomposition of chlorite salts. The production of chlorine dioxide electro-chemically from chlorides is unknown in the literature.

Lindstaedt U.S. Pat. No. 2,887,444 discloses a system in which a body of water, such as, a swimming pool, is provided with a low concentration of dissolved common salt and a stream of water is removed from the main body and electrolyzed to produce chlorine and the chlorine and water stream returned to the main body of water.

Murray U.S. Pat. No. 3,223,242 discloses another type of electrolytic cell for generating chlorine for introduction into a stream of water removed from and introduced back into a swimming pool or other body of water.

Richards U.S. Pat. No. 3,282,823 discloses an electrolytic cell for production of chlorine positioned in-line for introducing chlorine into a stream of water removed from and reintroduced into a swimming pool.

Other chlorinating systems using electrolytic cells for production of chlorine for chlorinating bodies of water are shown in Murray U.S. Pat. No. 2,361,663, Oldershaw U.S. Pat. No. 3,351,542, Colvin U.S. Pat. No. 3,378,479, Kirkham U.S. Pat. No. 3,669,857, and Yates U.S. Pat. No. 4,097,356. These electrolytic cells are disclosed in a variety of configurations and most of the cells utilize ion-permeable membranes separating the anode and cathode-containing compartments.

Ion-permeable membrane technology used in electrolytic cells is well developed. Ion-permeable membranes used in electrolytic cells have ranged from asbestos diaphragms to carboxylate resin polymers to perfluorosufonic acid polymer membranes. The perfluorosulfonic acid membranes were developed by Dupont for use in electrolytic cells. Anion exchange membranes, of polymers having anion functionality, are made by Ionics Inc. of Watertown, Mass.

Dotson U.S. Pat. No. 3,793,163 discloses the use of Dupont perfluorosulfonic acid membranes in electrolytic cells and makes reference to U.S. Pat. Nos. 2,636,851; 3,017,338; 3,560,568; 3,496,077; 2,967,807; 3,282,875 and British Pat. No. 1,184,321 as disclosing such membranes and various uses thereof.

Walmsley U.S. Pat. No. 3,909,378 discloses another type of fluorinated ion exchange polymer used in membranes for electrolytic cells for electrolysis of salt solutions.

Further discussion of membrane technology used in electrolytic cells may be found in Butler U.S. Pat. No. 3,017,338, Danna U.S. Pat. No. 3,775,272, Kircher U.S. Pat. No. 3,960,697, Carlin U.S. Pat. No. 4,010,085 and Westerlund U.S. Pat. No. 4,069,128.

Discussion of perfluorosulfonic acid membranes is also discussed in the technical literature, e.g., Dupont Magazine, May-June 1973, pages 22–25 and a paper entitled "Perfluorinated Ion Exchange Membrane" by Grot, Munn and Walmsley, presented to the 141st National Meeting of the Electro-Chemical Society, Houston, Texas, May 7–11, 1972.

The structure of electrodes used in electrolytic cells is set forth in most of the patents listed above. Additionally, the following U.S. Patents disclose particular configurations of anodes or cathodes used in electrolytic cells.

Giacopelli U.S. Pat. No. 3,375,184 discloses an electrolytic cell with controlable multiple electrodes which are flat plates of wedge-shaped configuration.

Ettel U.S. Pat. No. 3,821,097 discloses the use of flat plates in electroplating cells.

Lohrberg U.S. Pat. No. 3,951,767 discloses the use of flat plate electrolytic anodes having grooves along the bottoms thereof for conducting gas bubbles generated in the electrolytic process.

Andreoli U.S. Pat. No. 565,953 discloses electroplating apparatus having a plurality of metal screens which are not connected in the electric circuit and function to plate out the metal being separated by the electrolysis.

In "The $ClO_2$ content of chlorine obtained by electrolysis of NaCl", Electrochemical Technology 5, 56–58 (1967) Western and Hoogland report that $ClO_2$ is not produced in the electyrolysis of NaCl in the absence of chlorates.

SUMMARY OF THE INVENTION

One of the objects of this invention is to provide a new and improved system of treatment and method of treatment of bodies of water, such as, swimming pools, baths, reservoirs, sewage, etc., and bleaching of chemical pulp, etc., utilizing an electrolytic cell of novel construction.

Another object of this invention is to provide a new and improved electrolytic cell for production of mixtures of chlorine and chlorine dioxide for treatment of bodies of water and bleaching.

Another object of this invention is to provide a new and improved electrolytic cell having an arrangement comprising an anode, a cathode and at least one bipolar electrode, which produces a mixture of chlorine and chlorine dioxide.

Still another object of this invention is to provide a method of producing a mixture of chlorine and chlorine dioxide by electrolysis of an aqueous solution of a chloride salt.

Still another object of this invention is to provide a method and apparatus in which chlorine dioxide is produced by electrolysis of an aqueous solution of chloride salt utilizing an anode, cathode, and a bipolar electrodeseparated from the cathode by a cation exchange membrane and from the anode by an anion exchange membrane.

Other objects of this invention will become apparent from time to time throughout the specification and the claims as hereinafter related.

The foregoing objects are achieved by use of electrolytic generator having three sealed compartments, separated by two spaced ion-permeable membrane, one being a cation exchange membrane and the other being an anion exchange membrane, having a cathode in one end compartment, adjacent to the cation exchange membranes, and an anode in the other end compartment, adjacent to the anion exchange membrane. A bipolar electrode is positioned in the middle compartment between the anion and cation exchange membranes. Hydrogen is evolved from the cathode-containing compartment and a chlorine/chlorine dioxide mixture from the anode-containing compartment for use in bleaching or in treating bodies of water, such as, swimming pools, baths, reservoirs, sewage, etc. The anode, cathode and bipolar electrode are preferably flat plate electrodes, although other configurations, such as, cylindrical electrodes may be used. The generator is characterized by a rapid start up when energized with electricity. The generator is further characterized by generating a mixture of chlorine and chlorine dioxide at the anode.

DESCRIPTION OF THE PREFERRED EMBODIMENT

Figure 1:
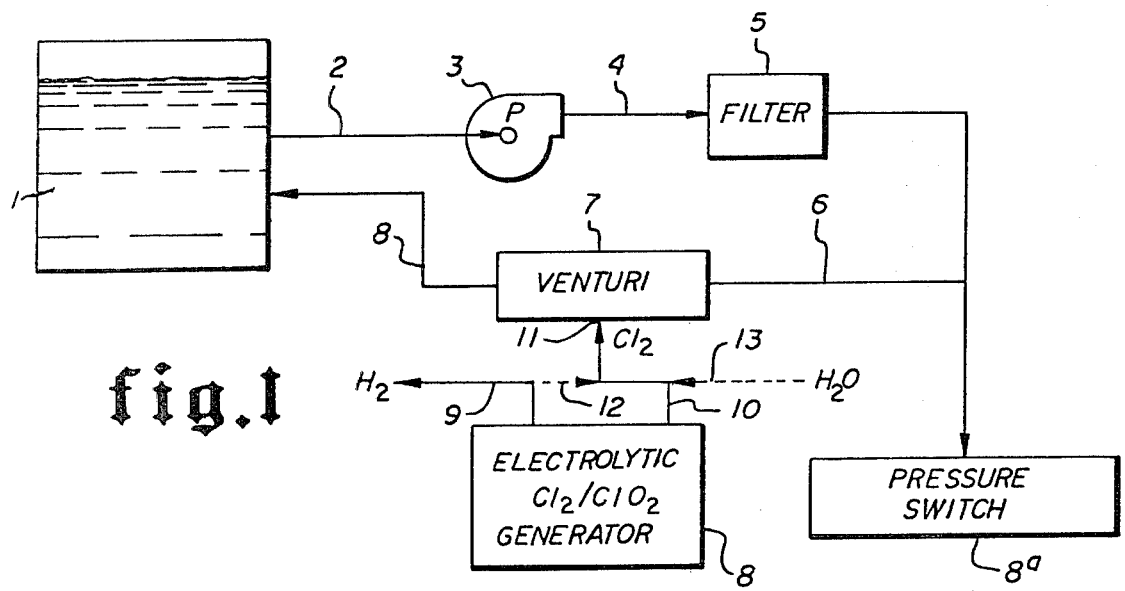
FIG. 1 is a schematic view of a treatment system for a body of water using an electrolytic generator for producing a chlorine-containing mixture.

Referring to the drawings by numerals of reference and more particularly to FIG. 1, there is shown a system for treatment of a body of water, such as, a swimming pool, bath, reservoir, body of sewage, etc. A body of water 1 is connected by a conduit 2 to a pump 3. The outlet side of pump 3 is connected by conduit 4 to a filter 5. The other side of filter 5 is connected by conduit 6 to the inlet side of the venturi mixer 7, the outlet side of which is connected by conduit 8 back to the body of water 1. The system shown provides for circulation of water from the body of water 1 by pump 3 accompanied by filtration in filter 5 and mixing in venturi mixer 7 before the water is returned to the main body of water 1. The system includes an electrolytic generator 8 which will be described more fully hereinafter.

Electrolytic generator 8 produces hydrogen in the cathode-containing compartment which is discharged as is indicated at 9. The generator produces a chlorine-chlorine dioxide mixture in the anode-containing compartment which is discharged as indicated at 10 and introduced into the venturi mixer 7 as indicated at 11.

Optionally, the hydrogen produced in the electrolytic generator may be mixed with the chlorine-chlorine dioxide mixture as indicated at 12 and introduced as a mixture into the venturi mixer 7.

Also, the mixture of chlorine dioxide and chlorine (optionally including hydrogen) may be mixed with a stream of water as indicated at 13 (also see FIG. 16 of the above cited copending applications) for introduction into the venturi mixer 7. The introduction of water as indicated at 13 may be in any conventional conduit system or may be in the form of a water-gas aspirator system in which the flow of water sucks in the mixture of chlorine dioxide and chlorine (and optionally hydrogen) gas discharged from chlorine generator 8. Systems of this general type which produce only chlorine are shown in Lindsteadt U.S. Pat. No. 2,887,444, Murray U.S. Pat. No. 3,223,242 and Yates U.S. Pat. No. 4,097,356.

The apparatus as shown can be operated in conjunction with conventional timing circuits as in various prior patents cited above and may also be operated in conjunction with switches that are energized simultaneously with the water circulating pump or the electrolytic generator may be energized in response to a flow switch or a pressure switch 8a so that it operates whenever water is circulating through the system shown in FIG. 1.

Figure 2:
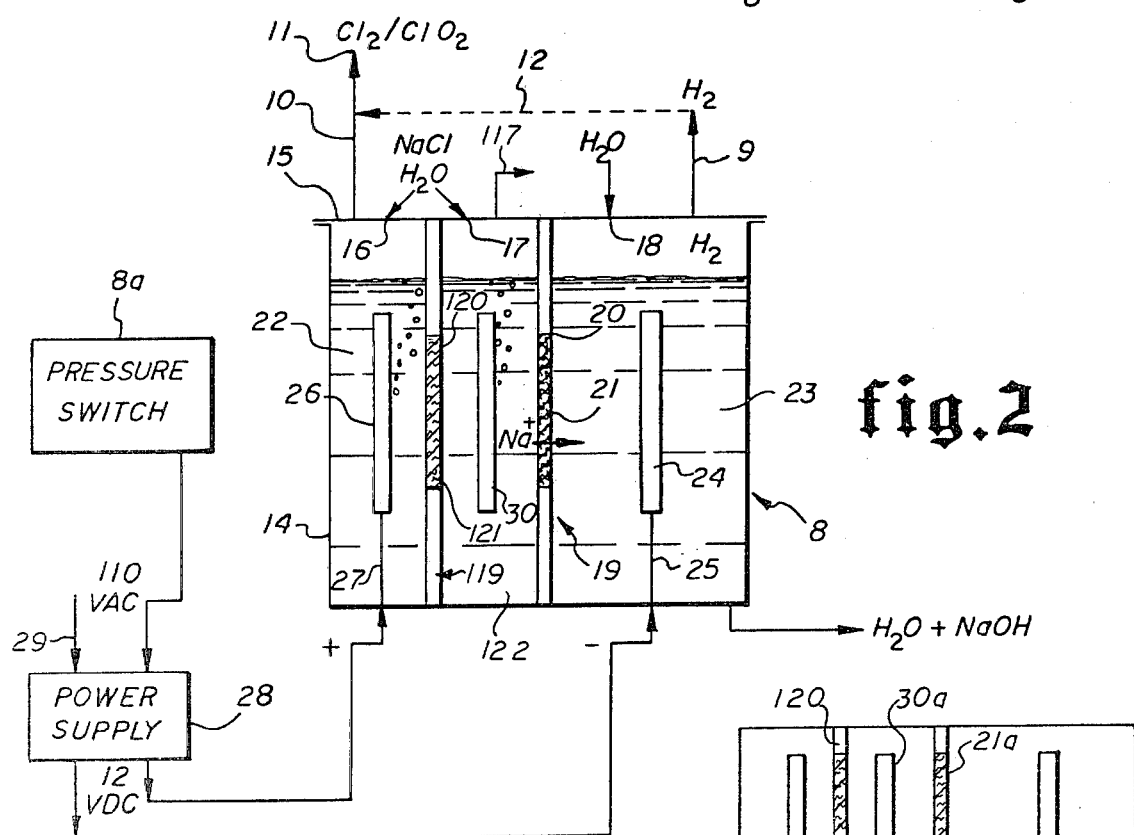
FIG. 2 is a schematic view, in elevation, of a preferred embodiment of the electrolytic generator to be used in the system shown in FIG. 1 or elsewhere.
Figure 3:
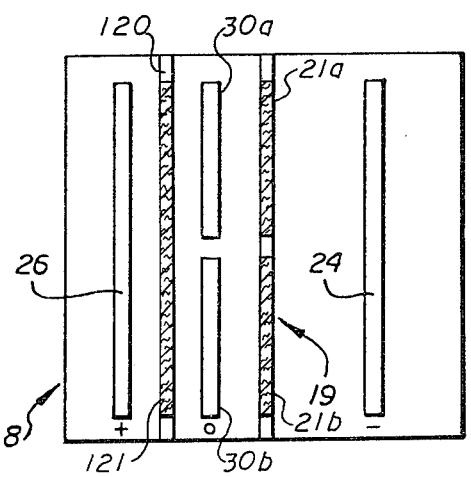
FIG. 3 is a plan view of the electrolytic generator shown in FIG. 2.

The electrolytic generator 8, shown schematically in FIG. 1, is of an improved design, as shown in FIGS. 2 and 3 of the drawings. The preferred embodiment of the chlorine generator 8, as shown in FIGS. 2 and 3, produces a mixture of chlorine dioxide and chlorine gas.

In FIGS. 2 and 3, electrolytic generator 8 consists of a hollow container 14 having a removable cover 15 sealed in place and having openings 16 and 17 for introduction of water and a chloride salt (NaCl) to the anode and bipolar electrode-containing compartments, and opening 18 for introduction of water to the cathode-containing compartment.

Hollow container 14 is divided by vertically extending walls 19 and 119 which have window openings 20 and 120 in which there are positioned ion-permeable membranes 21 and 121. Membrane 21 conducts cations, e.g. $Na^+$ and membrane 121 conducts anions, e.g. $Cl^-$. Ion-permeable membrane 21 may be a suitable cation exchange, electrically conductive membrane of the type conventionally used in electrolytic cells provided with membrane separation of the anode and the cathode-containing compartments. The preferred membranes are fluorinated polymers and preferably perflurosulfonic acid polymers, preferably NAFION, manufactured by Dupont. Ion exchange membrane 121 may be a suitable anion exchange membrane of an organic polymer having anionic functionality, such as membrane P/N 103 QZL 386 manufactured by Ionics Inc.

Wall member 19 including membrane 21 divides the interior of container 14 into an anode-containing compartment 22, a bipolar electrode-containing compartment 122, and a cathode-containing compartment 23. A cathode 24 is positioned in cathode compratment 23 and connected by electric lead 25 to a point external to container 14. Anode 26 is positioned in anode-containing compartment 22 and is connected by electric lead 27 to a point external to container 14. The apparatus is provided with a power supply, such as, a transformer 28 powered by 110 volt power source 29 and providing a 12 volt D.C. output connected to electric leads 25 and 27. A bipolar electrode 30 is positoned in compartment 122 in a direct line between anode 26 and cathode 24 and aligned with cation exchange membrane 21 and anion exchange membrane 121. Electrode 30 is electrically neutral in the sense that it is not connected by lead wire to the electric circuit energizing the anode 26 and cathode 24 to effect electrolytic decomposition of a salt solution. Electrode 30 is usually called a bipolar electrode since it has a measurable potential relative to the anode 26 or cathode 24 when the electrolytic circuit is energized. A gas sample outlet 117 is provided from compartment 122 for analyzing gas produces therein.

In FIG. 3, which is a plan view of the chlorine generator 8, the plate-like construction of the various electrodes 24, 26, and 30 is seen. Bipolar electrode 30 is preferably formed in two parts 30a and 30b as seen in FIG. 3. It has been found experimentally that better yields are often obtained by increasing the effective area of the anode. Thus, flat-plate electrodes are preferred in the electrolytic generator of this invention although in some applications the cylindrical electrodes or other shape may be used. The cathode 24 is preferably a flat-plate of steel or the like. The anode 26 and the electrically neutral electrode 30 are preferably flat-plates of carbon.

OPERATION

The electrolytic generator described and shown in FIGS. 2 and 3 has been tested and found to be a substantial improvement over more conventional electrolytic chlorine generators.

In the electrolytic generator shown, the cell is charged with water and salt, or brine, in both the anode-containing compartment 22 and the bipolar electrode-containing compartment 122; and with water in the cathode-containing compartment 23, all to a level above the top of the various electrodes but leaving a sufficient space at the top for the collection of gases. The ion-permeable membrane 21 in the cell was Dupont NAFION and ion-permeable membrane 121 was Ionics Inc. P/N 103 QZL 386. Bipolar electrodes 30a and 30b were placed approximately one inch from each of the membranes. 12 volt D.C. were applied and monitored by a D.C. amp meter in the circuit.

The system was turned on. The current flow was 20 amp. and voltage readings of the solution were nearly constant, at about 12 V., throughout the operation. This indicated that the anode-containing compartment represented a single uniform resistance relative to the cathode. There was immediate visible generation of hydrogen at the cathode 24. After a short period of time gas begins to form vigorously at the anode 26 but not at the bipolar electrode 30. The gas produced at the anode 26 was found to consist of a mixture of chlorine and chlorine dioxide. The proportions $Cl_2$ and $ClO_2$ varied under different conditions of operation but in most cases the $ClO_2$ is present as a substantial proportion of the $Cl_2$. When the current is decreased to about 10 amp. for full production, there is also vigorous generation of the gas mixture at the anode 26 but not at the bipolar electrode 30. At lower voltages and currents the evolution of gas is substantially reduced. When operating at full voltage and full current, there is a substantial and measurable potential measured across the three electrodes in the cell. The bipolar electrode 30 is at a potential of about 8 volts relative to the cathode. Anode 26 is at a potential of 12 volts relative to cathode 24. Under the conditions of operation described above, there is vigorous generation of hydrogen at cathode 24 and a rapid production of sodium hydroxide in cathode-containing compartment 23. Sodium hydroxide is the natural product obtained when the sodium ions passing through ion-permeable membrane 21 are neutralized at cathode 24. The resulting product is sodium metal which is almost instantly converted into sodium hydroxide with evolution of hydrogen. At the same time, there is vigorous generation of the gas mixture in the anode-containing compartment 22 at both the anode 26. The evolution of gas commences almost immediately compared to a relatively long induction period for production of chlorine in conventional electrolytic chlorine generators.

In the start up of a chlorine generator, there is usually a substantial induction, or lag time which results from the low conductivity in the cathode-containing compartment. Usually, the operation of the cell is relatively slow until sufficient sodium ions have been converted into sodium hydroxide at the cathode 24 and the caustic solution has reached a sufficient level of concentration to be highly electrically conductive. Likewise, in the anode-containing compartment, there is usually an induction, or lag time resulting from the solubility of chlorine in water, particularly when the chlorine is generated slowly. In this improved electrolytic generator there is a more rapid build up of sodium hydroxide in the cathode-containing compartment. Also, in this generator, the generation of the gas mixture at anode 26 is so vigorous that there is an almost immediate generation of gas from the cell.

In collecting and analyzing gases from this cell, the gases evolved at anode 26 and bipolar electrodes 30a and 30b can be separately removed, without interfering with the flow of current or the circulation of ions between the various electrodes. Gas discharge lines 10, 117 and 9 respectively, are provided at the top of the of the anode-containing compartment 22, bipolar electrode-containing compartment 122 and cathode-containing compartment 23 to collect the gases therefrom.

A slight negative pressure was maintained on the anode-containing compartment by use of an aspirator connected to a water supply and connected to the gas discharge line 10. A similar arrangement is used when sampling gases from compartment 122. The gases produced at the anode 26 and the bipolar electrodes 30a and 30b were separately removed as produced and were passed through a scrubber system to separate the chlorine and chlorine dioxide. A sodium hydroxide scrubber was placed on the suction of the separators to absorb chlorine and chlorine dioxide produced between runs.

The arrangement for separating chlorine from chlorine dioxide consisted of a separator which was a 100 ml. Nessler tube containing 90 ml. of a 10 g/liter solution of glycine in water followed by a 100 ml. Nessler tube containing 90 ml. of a 50 g/liter solution of potassium iodide which was acidified to pH 1.5 with sulfuric acid.

The glycine reacted with the chlorine to produce the monochloro and dichloro addition product with glycine. The unreacted chlorine dioxide was absorbed in the glycine solution or passed into the second tube where it reacted with the acidified potassium iodide to release iodine.

The glycine solution was analyzed for chlorine and chlorine dioxide by the D.P.D. method 409 E, Standard Methods for Examination of Water and Waste Water, 14th Edition, American Public Health Association. The potassium iodide solution was analyzed for chlorine dioxide by the Iodometric Method, 411 A, Standard Method for Examination of Water and Waste Water.

This analytical technique for separation of chlorine dioxide and chlorine is accepted as accurate when both gases are in the vapor phase as was the case in this study. Analytical results on the efficiency of the separation technique were in general agreement with those reported by Aiteta, et al., Stamford University, EPA Symposium, Cincinnati, Ohio, September 18–20, 1978, and were considered acceptable.

In this case, the electrolysis was carried out at 12 volts and 20 amp. Almost no gases were obtained from the bipolar electrodes 30a and 30b. The gases obtained from the anode-containing compartment 22 were a mixture of 0.42 parts chlorine dioxide per one part chlorine. The combined gases from anode-containing compartment 22 represented substantially the entire output of the anode side of the cell. When the cell was operated at 10 amp. and 12 V. a smaller output of gases was obtained from the anode-containing compartment 22 and the ratio of gases was 0.30 part chlorine dioxide per one part chlorine.

When this cell was first used, no brine was fed to the bipolar electrode-containing compartment 122 and that compartment was rapidly depleted of both sodium and chloride ions. The compartment became almost totally deionized and the resistance of the cell rose markedly. It was therefore necessary to provide a flow of brine to the bipolar electrode-containing compartment 122 to keep the cell operating satisfactorily.

In experimental work carried out with this electrolytic generator cell, a number of important observations were made. The resistance of the anode-containing compartment is directly related to the distance of the anode to the cathode and the saturation of salt in the electrolytic solution. The production of the gas mixture at the anode and the neutral electrode and the production of hydrogen at the cathode are directly related to the surface area of these electrodes and the current density. With a greater area of anode surface and neutral element surface and a higher current, more gas production occurs. The current flow however is limited by the resistance of the solution in the anode-containing compartment and the rate of flow of sodium ions through ion-permeable membrane 21. The rate of flow of sodium ions through the membrane is also directly related to the caustic level of sodium hydroxide in the solution in cathode-containing compartment 23 and is also related to the area or ion-permeable membrane 21.

By placing bipolar electrodes 30a and 30b in the cell and locating these electrodes in line between cathode 24 and anode 26 adjacent to ion-permeable membranes 21 and 121, substantial advantages are obtained. Bipolar electrodes 30a and 30b act as an anode relative to cathode 24 and also act as a cathode relative to anode 26. In this manner, bipolar electrode 30 assists in effecting a rapid transfer of sodium ions to cathode-containing compartment 23 and improves the rate of build up of caustic in that compartment. It also functions to improve the $Cl_2/ClO_2$ output and to reduce the induction period or start up time for the cell.

The removal of $Cl_2/ClO_2$ mixture and hydrogen and of caustic solution from the chlorine/chlorine dioxide generator cell 8 is shown schematically, as is the introduction of water and table salt, or brine, to the generator. Specific construction involves conventional structure in electrolytic cells and in gas recovery from such cells. Cell structures of the type shown in almost any of the patents referred to above can be used in production of a $Cl_2/ClO_2$ generator in accordance with this invention provided that the bipolar electrode is added and cation and anion exchange membranes are used as described. Also, the data reported with respect to size and shape of the bipolar electrodes in the above cited copending applications may be used in the design of this electrolytic cell. The collection of hydrogen and of the $Cl_2/ClO_2$ mixture may involve simple gas collection apparatus and may, if desired, involve the use of systems for mixing the hydrogen and $Cl_2/ClO_2$ gas mixture with water for introduction into a body of water as described in connection with FIG. 1 above. Also, the equipment can be used in association with timers or in connection with flow controlling switches or controls or in connection with pressure responsive switches and controls as described in any of the patents listed above.

In carrying out this process, any soluble chloride salt may be used, e.g. NaCl, KCl, LiCl, RbCl, CsCl, $NH_4Cl$, $MgCl_2$, $CaCl_2$, etc., although for economic reasons sodium chloride is preferred. When a chloride salt is electrolyzed in an anode-containing compartment containing an electrically energized anode and a plurality of bipolar electrodes, with anion and cation exchange membranes separating them from the anode and cathode-containing compartments, there is a very substantial production of gas which consists of chlorine dioxide and chlorine. In the case of electrolysis under conditions which produce mixtures of chlorine dioxide and chlorine, the product gases may be used for many of the purposes for which chlorine dioxide is used and may also be used for many of the purposes for which chlorine is used. This mixture is particularly efficient in disinfecting bodies of water, such as, water reservoirs, swimming pools, sewage, etc. and in bleaching chemical pulps. For reasons of safety the gases are preferably recovered as aqueous solutions for storage or in-situ use.

While this invention has been fully and completely with special emphasis upon one preferred embodiment, it should be understood that within the scope of the appended claims the invention may be practiced otherwise than as specifically described herein.

I claim:
1. A method for treating a body of water which comprises
   providing a chlorine/chlorine dioxide generator comprising a hollow container having a pair of walls, each including a permeable membrane, dividing said container into three compartments,
   one of said membranes being an anion exchange membrane,
   the other of said membranes being a cation exchange membrane,
   an anode positioned in the end compartment adjacent to said anion exchange membrane,
   a cathode positioned in the end compartment adjacent to said cation exchange membrane,
   a bipolar electrode positioned in the middle compartment between said membranes and being of a size and shape permitting free circulation of electrolyte therearound and being exposed on all sides to the same aqueous electrolyte,
   providing aqueous electrolyte to said cathode-containing compartment,
   providing a concentrated water solution of a chloride salt to said anode-containing compartment and to said bipolar electrode-containing compartment so that said anode and said bipolar electrode are surrounded by said aqueous chloride salt solution, passing sufficient direct current through said water and said chloride salt solution to produce chlorine/chlorine dioxide at said anode and to produce hydrogen and a hydroxide at said cathode, collecting said chlorine/chlorine dioxide, and mixing said chlorine/chlorine dioxide at a predetermined rate with part of said body of water and returning the resulting mixture to said body of water.

2. An electrolytic gas generator comprising a hollow container having a pair of walls, each including a permeable membrane, dividing said container into three compartments, one of said membranes being an anion exchange membrane, the other of said membranes being a cation exchange membrane, an anode positioned in the end compartment adjacent to said anion exchange membrane, a cathode positioned in the end compartment adjacent to said cation exchange membrane, a bipolar electrode positioned in the middle compartment between said membranes and being of a size and shape permitting free circulation of electrolyte therearound and being exposed on all sides to the same aqueous electrolyte and said generator being operable, when filled with an aqueous solution of chloride salt in said anode-containing compartment and in said bipolar electrode-containing compartment, and with aqueous electrolyte in said cathode-containing compartment and energized, to produce chlorine dioxide or a mixture of chlorine and chlorine dioxide in said anode-containing compartment.

3. An electrolytic generator according to claim 2 in which there are a plurality of bipolar electrodes in said middle compartment.

4. An electrolytic generator according to claim 2 in which said membranes each comprise only a portion of the respective dividing walls.

5. An electrolytic generator according to claim 2 in which said container includes a plurality of inlet openings for introduction of aqueous electrolyte to said cathode-containing compartment and an aqueous chloride salt solution to the other compartments; and a plurality of outlets from said compartments for collection of hydrogen from said cathode-containing compartment and a mixture of chlorine and chlorine dioxide from said anode-containing compartment and for sampling gas produced in said middle compartment.

6. A water treating system comprising a conduit for conducting water, gas-water mixing means positioned in said conduit for flow of water therethrough, a chlorine/chlorine dioxide generator connected to said mixing means to introduce a chlorine/chlorine dioxide mixture thereto, and comprising a hollow container having a pair of walls, each including a permeable membrane, dividing said container into three compartments, one of said membranes being an anion exchange membrane, the other of said membranes being a cation exchange membrane, an anode positioned in the end compartment adjacent to said anion exchange membrane, a cathode positioned in the end compartment adjacent to said cation exchange membrane, a bipolar electrode positioned in the middle compartment between said membranes and being of a size and shape permitting free circulation of electrolyte therearound and being exposed on all sides to the same aqueous electrolyte, said generator being operable, when filled with an aqueous solution of chloride salt in said anode-containing compartment and in said bipolar electrode-containing compartment, and with aqueous electrolyte in said cathode-containing compartment and energized, to produce chlorine dioxide or a mixture of chlorine and chlorine dioxide in said anode-containing compartment, and means forming outlets from said end compartments for conducting chlorine/chlorine dioxide and hydrogen therefrom.

7. A water treating system according to claim 6 in which there are a plurality of bipolar electrodes in said middle compartment.

8. A water treating system according to claim 6 in which said membranes each comprise only a portion of the respective dividing walls.

9. A water treating system according to claim 6 in which said container includes a plurality of inlet openings for introduction of aqueous electrolyte to said cathode-containing compartment and an aqueous chloride salt solution to the other compartments; and a plurality of outlets from said compartments for collection of hydrogen from said cathode-containing compartment and a mixture of chlorine and chlorine dioxide from said anode-containing compartment and for sampling gas produced in said middle compartment.

* * * * *